Oct. 4, 1960 W. C. JOHNSON ET AL 2,955,193
WELDING WITH SELF REMOVING FLUX
Filed Jan. 10, 1958
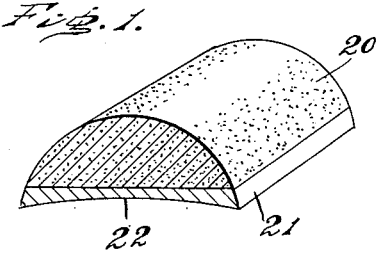
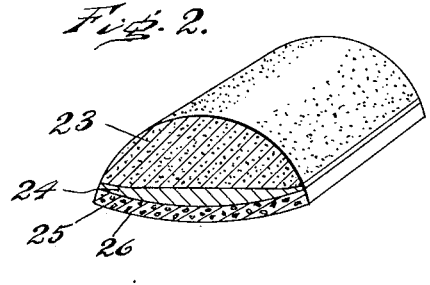
INVENTOR
Wallace C. Johnson
Hallock C. Campbell
BY
ATTORNEYS.

# United States Patent Office 2,955,193
Patented Oct. 4, 1960

2,955,193
WELDING WITH SELF REMOVING FLUX

Wallace C. Johnson, Hamden, Conn., and Hallock C. Campbell, Swarthmore, Pa., assignors to Arcos Corporation, Philadelphia, Pa., a corporation of Pennsylvania Filed Jan. 10, 1958, Ser. No. 708,110

2 Claims. (Cl. 219—73)

In all submerged arc welding the solidified flux—called slag—must be fully removed before a second pass can be made over the first pass.

The present application is a continuation-in-part of our copending application, Ser. No. 528,046, filed August 12, 1955, now abandoned, for Welding With Self Removing Flux.

The present invention relates to self-removing fluxes and methods of using the same in electric arc welding.

A purpose of the invention is to facilitate the removal of welding flux and particularly to eliminate the need for chipping or hammering off the slag, which often takes as much time as the welding.

A further purpose is to facilitate the removal of flux from stainless steel welds, especially deep butt and fillet welds.

A further purpose is to obtain an automatic self-parting effect of welding flux especially in electric submerged arc welding.

A further purpose is to incorporate a zirconium mineral which is of course of high density and highly refractory, in the form of discrete particles in the size range between 50 and 150 mesh per linear inch, and preferably in the size range between 80 and 100 mesh per linear inch, in a welding flux desirably in the porportions of 5 to 75 percent by weight of the flux.

Further purposes appear in the specifications and in the claims.

The drawings are sectional perspectives of slag layers useful in explaining the invention.

In the prior art, it has ordinarily been necessary to chip, pulverize or hammer off the welding flux or slag from one welding bead before laying down another welding bead in electric arc welding, especially submerged arc welding.

The removal of flux has been particularly difficult in the case of stainless steel. The high chromium content in stainless steel welds appears to be responsible for the clinging effect. The flux forms needle-like bands which freeze and cling to the hot weld at irregular intervals. This effect is so pronounced that it is known in the art as "zebra."

This clinging action on stainless steel welding particularly, and to some extent on other welding, is characteristic of various competitive fluxes and is by no means restricted to any particular flux composition. The lower coefficient of expansion in all stainless steels promotes this condition.

Efforts have been made to change the coefficient of expansion of the slag so that it would break loose when the weld solidified, but to the best of our knowledge no chemical addition or expedient has been found prior to the present invention which appears to solve the problem satisfactorily, without detracting from the weld composition or desired strength.

We have discovered that the clinging action can be overcome by incorporating in the slag a zirconium mineral which is of course very dense and will settle to the bottom, and will desirably only partly melt in the flux. The mineral to function properly should be in particles ranging from 50 to 150 mesh per linear inch and preferably from 80 to 100 mesh per linear inch. Coarser particles than 50 mesh per linear inch do not properly perform the function of shielding the arc and finer particles than 150 mesh per linear inch do not form the separate slag layer at the weld metal which is important in the present invention, and do not give the good slag removal characteristics.

The preferred material for use in the present invention is the mineral zircon or zirconium silicate. Other zircon minerals such as zirconium oxide may be used.

It is preferable to use the zirconium mineral in the proportions of 5 to 75 percent by weight of the flux, preferably about 10 to 25 percent and most desirable about 20 percent.

The zircon or other dense zirconium mineral can be incorporated with anhydrous fibrous calcium silicate such as wollastonite as explained in Wallace C. Johnson copending application Serial No. 528,049, for Welding with Self-Removing Flux filed August 12, 1955, the proportion of wollastonite suitably being between 5 and 95 percent and the wollastonite having the property as explained in said copending application of causing the weld bead to be concave and to wash the side walls of the welding groove.

Other suitable materials in the welding flux are lime, preferably 0 to 50 percent, limestone, preferably 5 to 15 percent, silica, preferably 5 to 10 percent, an alkali or alkaline earth fluoride such as fluorspar or cryolite in the proportion of 2 to 12 percent, zirconium silicate in the proportion of 5 to 20 percent, and suitably a ferroalloy such as ferrochromium, ferromaganese or ferrosilicon, desirably in the proportions of 2 to 8 percent total ferroalloy, all proportions being by weight. The ingredients are preferably agglomerated as explained in said Johnson application.

In operation, using for example, the electric submerged arc welding technique, or the electric arc welding technique generally when the work is below the arc, the cool slag separates automatically from the weld bead. The bottom of the slag layer has a terrazzo-like surface which has a high concentration of crystalline grains which appear to be zircon. This lower layer appears to be of gray color and resembles fish scales under the microscope.

The lower layer is only two or three grains thick and covers the surface that adjoins the metal, about .010" to .030" thick.

The grains have a milky appearance suggesting that they had started to undergo a reaction or had started to melt, but in many cases there is a clear center indicating that the reaction or fusion was not complete.

The usual slag bead of the prior art, as shown in Figure 1, on solidification, forms a domed top layer 20 and a bottom layer 21 which is concave on the bottom at 22.

The welding slag in accordance with the present invention, when used in a welding groove, solidifies in three layers 23, 24 and 25, the lower layer 25 containing zircon, and especially when wollastonite is included, has a convex bottom 26.

It appears as a possible theory, which applicants offer without predicating the invention on the theory, that the high density mineral particles of zirconium mineral pass through the molten flux without fully melting to deposit on the metal due to their high density. At least some of the grains of zirconium mineral do not fully melt and are not fully incorporated, and thus form a parting or bottom layer.

The fact that the zircon grains have a density of the order of 4.8 whereas the flux proper has a density of about 3.8 would appear to account for the tendency of the zircon particles to separate downwardly and the fact that the steel or other molten metal in the weld is of still higher density of course tends to make the zircon or other mineral particles remain against the surface of the solidifying weld.

All percentages herein are by weight.

In view of our invention and disclosure, variations and modifications to meet individual whim or particular need will doubtless become evident to others skilled in the art, to obtain all or part of the benefits of our invention without copying the process and composition shown, and we, therefore, claim all such insofar as they fall within the reasonable spirit and scope of our claims.

Having thus described our invention, what we claim as new and desire to secure by Letters Patent is:

1. The method of electric arc welding and promoting removal of slag, which comprises incorporating in the flux a mineral of zirconium of a particle size between 50 to 150 mesh per linear inch, carrying on the welding operation by projecting an arc which melts the flux, and depositing the zirconium mineral as a separate slag layer adjoining the weld metal having a coefficient of expansion which is markedly different from that of the weld metal.

2. The method of electric arc welding of stainless steel and promoting removal of flux from the weld metal, which comprises incorporating in the flux zirconium mineral having a particle size between 50 and 150 mesh per linear inch in the proportions of from 5 to 75 percent by weight, carrying on the welding operation by projecting an arc which melts the flux, and depositing the zirconium mineral as a separate slag layer against the weld metal, said separate slag layer having a coefficient of expansion substantially different from that of the weld metal.

References Cited in the file of this patent

UNITED STATES PATENTS

| | | |
|---|---|---|
| 1,953,942 | Applegate | Apr. 10, 1934 |
| 2,544,334 | Linnert | Mar. 6, 1951 |
| 2,719,801 | Keever | Oct. 4, 1955 |